July 16, 1968     C. P. PORTERFIELD ET AL     3,393,348

OVERVOLTAGE PROTECTOR DEVICE FOR INDUCTION HEATING INSTALLATION

Filed July 19, 1965

INVENTORS.
CECIL P. PORTERFIELD &
GARY W. VEST
BY
*Tilberry & Body*

ATTORNEYS

United States Patent Office 3,393,348
Patented July 16, 1968

3,393,348
OVERVOLTAGE PROTECTOR DEVICE FOR
INDUCTION HEATING INSTALLATION
Cecil P. Porterfield, Cleveland, and Gary W. Vest, Parma,
Ohio, assignors to Park-Ohio Industries, Inc., a corporation of Ohio
Filed July 19, 1965, Ser. No. 473,062
13 Claims. (Cl. 317—31)

ABSTRACT OF THE DISCLOSURE

There is provided a device for turning off a motor-generator set used to power an induction heating installation when the output voltage of the generator is above a preselected value. This device includes a switching unit which is actuated when a capacitor is charged beyond a given voltage. This capacitor has a low time constant charging circuit. A voltage proportional to the generator output voltage is applied to this charging circuit; however, a second control circuit subtracts voltage from the charging circuit in accordance with a second capacitor having a high time constant charging circuit. As the overvoltage of the generator increases, the voltage applied to the low time constant charging circuit is higher so that the first capacitor is charged more rapidly and the second capacitor has less effect on the delay in actuating the switching unit. Thus, the time delay in turning off the generator is less for higher overvoltages.

The present invention pertains to the art of overvoltage protector devices and more particularly to an overvoltage protector device for an induction heating installation.

The present invention is particularly applicable for protecting an induction heating installation from destructive, or harmful, overvoltages and it will be described with particular reference thereto; however, it will be appreciated that the invention has much broader applications and may be used as a protector device for various other electrical installations.

The term "overvoltage" as used in the induction heating field refers to a voltage greater than the rated voltage of a power supply, such as a generator. This generally accepted definition of "overvoltage" is utilized herein.

An induction heating installation quite often includes a rotary generator having output leads connected across a heating station. The general construction of the generator determines the maximum voltage which the generator should supply to the heating station. By changing various parameters of the heating station or its electrical components, a voltage greater than the maximum rated voltage of the generator may appear across the output leads. If this overvoltage is between 100%–115% of the maximum rated voltage, generally the generator will not be harmed even during prolonged duty cycles at this somewhat low overvoltage level. If the overvoltage exceeds 115% of the maximum rated voltage, prolonged operation at this overvoltage level can harm various components of the generator. In particular, this level of overvoltage may increase the temperature of the windings within the generator to a value that will destroy the insulation on the windings. When this happens, the generator must be disassembled and new windings must be installed. This is a costly procedure and causes substantial down time of the heating installation.

To assure that the output voltage of the generator does not exceed certain overvoltage values, it has been proposed that the generator be provided with an overvoltage protector device which turns off the generator when the overvoltage exceeds a preselected level. Although such proposed devices protect the generator from destructive overvoltages, heretofore they have all possessed certain disadvantages. For instance, it has been found that transient voltages are created within the output circuit of the generator when the heating station is first energized by the generator. These transient voltages often exceed the maximum rated output voltage of the generator; therefore, these transient voltages could trip or actuate the previously proposed overvoltage protector devices even though these voltages had short durations and would not cause destructive heating within the windings of the generator. For this reason, the tripping or actuation of the overvoltage protector device upon appearance of the transient voltages was not required for protection of the generator.

In addition, the previously proposed overvoltage protector devices generally would have a preset overvoltage which would actuate the device. Often actuation of the overvoltage protector device on reaching the preset voltage was detrimental. It has been found that overvoltages of approximately 115% of the rated maximum voltage can be tolerated for a substantial time, such as twenty to thirty seconds, without damage to the generator. As the overvoltage increases, the time which will not harmfully affect the generator decreases. For instance, when the overvoltage exceeds approximately 130%, the generator should be allowed to function for only a few seconds. When the overvoltage exceeds approximately 160%, the generator should be shut down immediately. Heretofore, the overvoltage protector devices for generators could not effectively vary the time before shutting down the generator in accordance with the amount of overvoltage appearing in the output circuit of the generator. Basically, the prior protector devices were responsive to a preselected voltage. The instant a voltage exceeding the preselected voltage appeared in the output circuit, the device would shut down the generator. This preselected voltage had to be low enough for the protector device to shut down the generator when the overvoltage was approximately 115% of the rated maximum voltage. Otherwise, the generator could function indefinitely at this low level and cause damage to the generator. Consequently, the generator was shut down when the overvoltage condition was only a momentary transient even at low overvoltage levels.

These and other disadvantages of the prior overvoltage protector devices are completely overcome by the present invention which is directed toward an overvoltage protector device for a generator, or a similar machine, which device allows the generator to function for a short time at an overvoltage level before the generator is shut down. The time delay before the generator is shut down is determined by the level of the overvoltage. The higher the voltage, the shorter the time before the generator is shut down.

In accordance with the present invention, there is provided an improvement in an induction heating apparatus of the general type described above. This improvement includes the provision of an overvoltage protector having an electron switching device for shutting down the power supply when a given switching voltage is applied to the switching device. There is provided a first capacitor across which the switching voltage appears and a voltage source for charging the first capacitor with the output of the voltage source formed from adding a first voltage proportional to the output voltage of the power supply and a second voltage determined by the charged condition of a second capacitor. The capacitors are selected so that both voltages are required to charge the first capacitor to the switching voltage when low overvoltages are experienced and only the first voltage is required to charge the first capacitor to the switching voltage when high overvoltages are experienced.

By providing an induction heating device with this overvoltage protector device, the first capacitor which controls the switching device is charged at a rate determined by the output voltage of the generator. If the output voltage does not exceed a certain value, such as 115% of the rated maximum output voltage, the charging of the first capacitors by both voltages will not shut down the generator.

In accordance with another aspect of the present invention, there is provided a voltage responsive time delay control device for actuating a switch in accordance with a sensed voltage variable above a given value. The control device comprises an electronic switching device; the switch being actuated when the switching device is conductive; means for rendering the switching device conductive in response to a preselected voltage imposed on said switching device; and circuit means for imposing the preselected voltage on the switching device in a time period inversely proportional to the extent the sensed voltage exceeds the given value. The circuit means mentioned above comprises a first capacitor across which the switching voltage appears and a charging circuit for the first capacitor. This charging circuit comprises a first voltage source and a second voltage source; means for adding the voltages from these sources; the voltage from at least the first voltage source being proportional to the sensed voltage; the second voltage source including a second capacitor with the output of the second source being controlled by the charged level of the second capacitor; and, with the time constant for charging the second capacitor being substantially greater than the time constant for charging the first capacitor.

When a high overvoltage is being sensed, the charging circuit for the first capacitor is more effective for actuating the switch, and the switch is actuated after a very short time delay because of the low time constant of its charging circuit. When a low overvoltage is sensed, the charging circuit for the second capacitor is more effective for actuating the switch, and a longer time delay occurs before the switch is actuated because of the high time constant of its charging circuit. In this manner, the time delay for actuating the switch is controlled by the level of the overvoltage being sensed. When utilizing this device for controlling a generator in an induction heating installation, the device will allow slight overvoltages for a substantial period of time and large overvoltages for only a small period of time. This is a substantial improvement over the prior overvoltage protector devices for generators of the type used in induction heating.

The primary object of the present invention is the provision of an overvoltage protector device for the power supply of an induction heating installation which device shuts down the power supply on the appearance of an overvoltage after a time delay dependent on the level of the overvoltage.

Another object of the present invention is the provision of an overvoltage protector device for the power supply of an induction heating installation which device includes an actuating capacitor for shutting down the power supply with the time for charging the capacitor providing an inherent time delay in shutting down the power supply in a time dependent upon the level of overvoltage.

These and other objects and advantages will become apparent from the following description used to illustrate the preferred embodiment of the invention as read in connection with the accompanying drawing in which.

Figure 1:
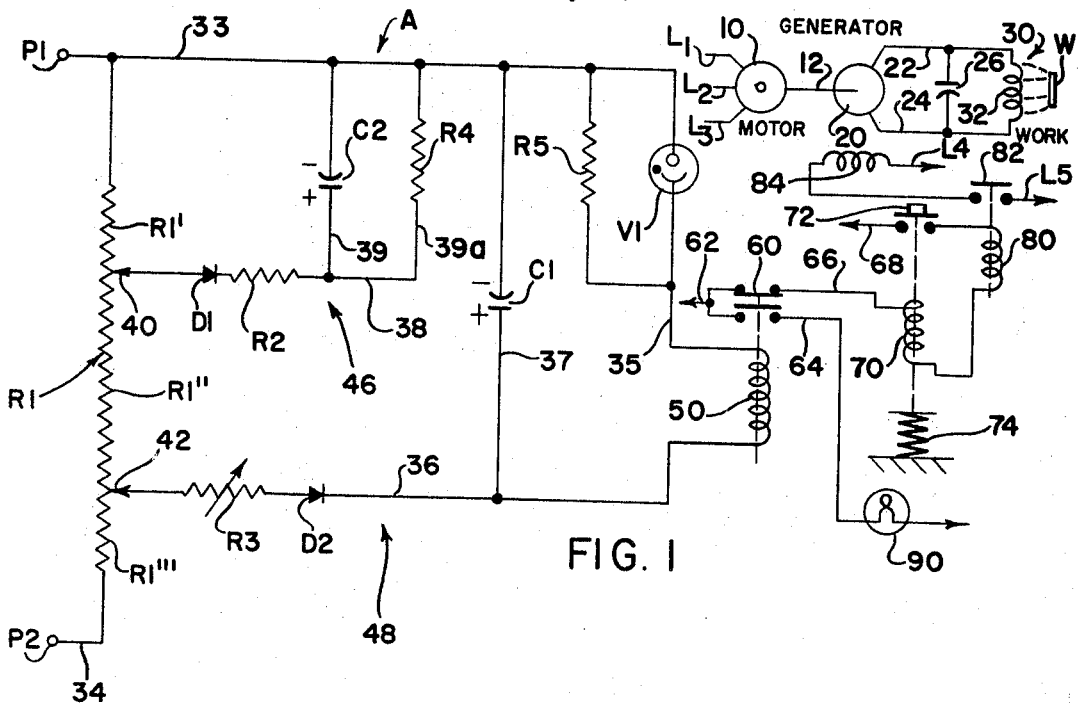
FIGURE 1 is a wiring diagram illustrating, somewhat schematically, the preferred embodiment of the present invention.

Referring now to the drawing wherein the showings are for the purpose of illustrating a preferred embodiment of the invention only and not for the purpose of limiting same, FIGURE 1 shows an induction heating installation including a three phase motor 10 powered by input leads $L_1$, $L_2$ and $L_3$ and having an output shaft 12 drivingly connected onto a power supply, shown as a generator 20. Output leads 22, 24 of generator 20 are connected by a power factor correcting capacitor, or can, 26 and terminate at a heating station 30. The heating station, in accordance with the illustrated embodiment of the present invention, includes an induction heating coil 32 and a workpiece W magnetically coupled with the coil. As so far described the induction heating installation does not differ from commonly used installations. By changing certain parameters or components, the output voltage of generator 20 appearing across leads 22, 24 may exceed the predetermined maximum output voltage of generator 20. When this happens, the generator may be damaged. To prevent overvoltages from damaging the generator 20, in accordance with the preferred embodiment of the invention, there is provided an overvoltage protector device A which will be hereinafter described in detail.

The device A includes input leads 33, 34 connected across terminals P1, P2. In practice terminals P1, P2 are connected across a transformer which senses the output voltage of generator 20. This same transformer may be used for various other meters and measuring devices, not shown, or may be specifically used for powering the device A. Lead 33 is connected directly onto a parallel branch 35, whereas lead 34 is connected onto this same branch through line 36. A line 37 between lead 33 and line 36 includes a capacitor C1. Between lead 33 and line 36 there is also provided an intermediate line 38 connected with parallel branches 39, 39a. A resistor R1, which coacts with slidable contacts 40, 42, provides a voltage divider between the input terminals P1, P2. This voltage divider functions in a manner to be hereinafter described in detail.

Within branch 35 there is provided an electron switching device, such as a gas filled diode V1, and an actuating coil 50 of a relay. It is appreciated that other switching devices could be used in branch 35. The diode V1 is nonconductive until a given voltage is imposed across the electrodes thereof. At this time the diode becomes conductive and actuates the relay elements controlled by coil 50. The effect of this operation will be described later.

Device A is actuated by the creation of a firing, triggering or switching voltage across diode V1. To accomplish this function, the device A includes a primary charging circuit 48 and a secondary or control charging circuit 46. Control charging circuit 46 includes a capacitor C2 in branch 39, a resistor R4 in branch 39a, a resistor R2 in line 38 and impedance or resistor sections R1'' and R1''' formed by the position of sliding contacts 40, 42. In practice, an AC voltage is impressed across terminals P1, P2; therefore, the control charging circuit 46 includes a solid state diode D1 for rectifying the current passing through branches 39, 39a.

Referring now to the primary charging circuit 48, this circuit includes the previously mentioned capacitor C1 in line 37, an adjustable resistor or rheostat R3 and impedance or resistor section R1'''. This primary charging circuit 48 includes a solid state diode D2 for rectifying the current passing through branch 35 and line 37. It should be appreciated that the two rectifying diodes D1, D2 could be replaced with a single rectifying diode in lead 34 without departing from the intended scope of the present invention.

Referring now to coil 50, the coil controls a double pole, double throw switch 60 which alternately connects input line 62 with line 64 and line 66. When the switch 60 is in the position shown in FIGURE 1, current may flow through line 66, to a corresponding input line 68. To form continuity between lines 66, 68 a coil 70 must hold down reset contact 72 against the force created by a biasing means, such as spring 74. When current flows through line 66 to line 68, another coil 80 is energized which will close contact 82. This connects input lines L4, L5 to energize the field winding 84 for generator 20.

In operation of the preferred embodiment shown in FIGURE 1, reset contact 72 is closed which energizes coil 80 and closes contact 82. This energizes field winding 84 so that the generator 20 supplies power to the heating station 30. The output voltage across leads 22, 24 is impressed across a transformer or another voltage sensing component, not shown. The output of the transformer is imposed across terminals P1, P2 so that the voltage across the divider R1 is proportional to the output voltage of the generator 20. The control charging circuit 46 has a relatively large time constant, such as approximately 4.0 seconds, and the primary charging circuit 48 has a relatively small time constant, such as approximately 0.7 second. This differential in the time constants for the charging circuits 46, 48 provides a time delay for operating switch 60, which time delay is determined by the voltage impressed across terminals P1, P2.

Assuming that a relatively slight overvoltage appears across leads 22, 24, initially the voltage appearing across capacitor C1, i.e., section R″, will be insufficient to fire the diode D1. Capacitor C2, which is assumed for discussion to be uncharged, initially acts as a short circuit across resistor R4 and section R1. Thus, the impedance of section R1′ in voltage divider R1 appears to have a very low value. As the capacitor C2 charges it will draw less current and become less effective in providing a shorting path around resistor R4. This will make the resistance within section R1′ appear to increase in value. This apparent increase in the impedance value of section R1′ will continue until the capacitor C2 is fully charged. At that time, resistor R4 will be completely active, and the total impedance or resistance between terminal P1 and contact 40 will have drastically increased from the low value when the capacitor C2 was uncharged. This increase in the apparent resistance between terminal P1 and contact 40 follows an exponential curve determined by the time constant of the charging circuit 46.

As the apparent resistance increases exponentially between terminal P1 and contact 40, the impedance or resistance between terminal P1 and contact 42 is also increased exponentially, and the voltage between terminal P2 and contact 42 is decreased in a like manner. Since the voltage between terminals P1 and P2 is distributed along the voltage divider R1 in accordance with the distribution of impedance along the divider, the increase in impedance of section R1′ will increase the voltage across lead 33 and line 36. This in turn will cause the capacitor C1 to charge exponentially to a value sufficiently high to actuate or fire gas filled diode V1. When this happens, the coil 50 changes the position of switch 60 to provide continuity between lines 62, 64. This energizes an alarm or signal device, schematically represented as an incandescent bulb 90. At the same time, switch 60 breaks the contact between lines 62, 66. This de-energizes coils 70 and 80. Spring 74 releases reset contact 72. At the same time, coil 80 opens contact 82. This disconnects the field winding 84 and shuts down the power supply or generator 20.

From the above description of the operating characteristics of the device A, it is appreciated that the diode V1 is fired, triggered or switched primarily by the charging of capacitor C1 which is controlled, at low overvoltages, by charging of capacitor C2. Initially at low overvoltages, the voltage across section R1″ is not sufficient to charge capacitor C1 to the proper level for firing the diode V1. As capacitor C2 is charged, the voltage across R′ and R″ increases to charge capacitor C1 to the firing voltage of diode V1.

As the overvoltage as sensed between terminals P1, P2 increases, i.e., a high overvoltage is sensed, the voltage in section R1″ is initially high so that the capacitor C1 fires the diode V1 and less assistance from the voltage caused by the charging of capacitor C2 is required. If the overvoltage exceeds a preselected value, the voltage across section R1″ will be sufficient in itself to charge capacitor C1 to a level that will fire the diode V1. When this happens, the effect of the control charging circuit 46 on the operation of device A is somewhat negligible.

From this description, it is appreciated that the time delay for firing the electron switching device, or diode, V1 is dependent upon the amount or level of the overvoltage. A slight amount of overvoltage will require a complete charging of capacitor C2 before diode V1 is fired. This will require a substantial amount of time. With a higher overvoltage, the capacitor C1 can be charged to the firing level of the diode without substantial assistance from the charging of capacitor C2. In essence, the charging circuit 48 controls switching capacitor C1 and, at low overvoltages, the circuit 46 robs voltage from circuit 48 until the capacitor C2 is charged. The charging of capacitor C2 requires more time than the charging of capacitor C1 so that when the overvoltage is low, the charging of capacitor C2 has a time delaying effect on the ultimate charging of capacitor C1.

Figure 2:
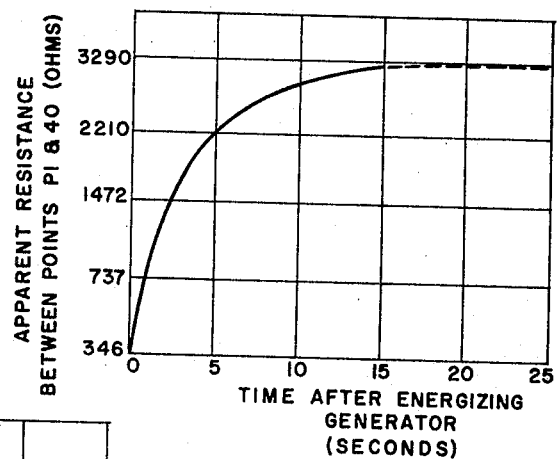
FIGURE 2 is a graph illustrating the operating characteristics of one of the components shown in FIGURE 1.

To better understand the operating characteristics of device A, a graph in FIGURE 2 represents the charging characteristics of capacitor C2. This graph illustrates how the apparent resistance between terminal P1 and contact 40 increases upon the charging of the capacitor C2.

Figure 3:
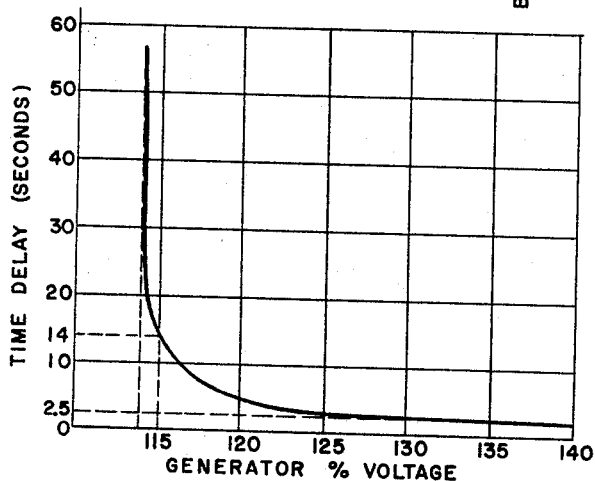
FIGURE 3 is a graph illustrating the operating characteristics of the preferred embodiment as shown in FIGURE 1.

The graph illustrated in FIGURE 3 shows the time delay for opening the field winding 84 when various overvoltages are exhibited at the output of the power supply or generator. This graph is self explanatory.

Referring again to FIGURE 1, the resistor R5 is provided in parallel around diode V1. The resistance of this resistor is relatively high so that the current flow through the resistor cannot pull in or actuate the relay controlled by coil 50 during normal operation of device A. This coil does provide a continuous flow of current through coil 50 so that firing of diode V1 positively provides sufficient current to energize the relay controlled by coil 50. The resistance of resistor R5 is selected so that the current flow allowed by the resistor is sufficient to hold switch 60 in the energized position even though the diode V1 stops conducting. Of course, when the generator is shut down, no voltage appears across divider R1 and the current through resistor R5 is terminated to deactuate the coil 50. The provision of resistor R5 provides a more positive operation of switch 60.

There is an additional advantage of using the resistor R5. If the diode V1 should fail, the resistor R5 provides a certain amount of overvoltage protection. When the overvoltage reaches a relatively high level, the current flow allowed by resistor R5 will be sufficient to pull in, or acutate, switch 60 by coil 50. Although this overvoltage at which the resistor R5 will actuate switch 60 is substantially over the intended triggering voltage or actuation voltage for device A, the resistor does provide a certain amount of protection in case the diode V1 should not conduct.

The resistor R3 is utilized for adjusting the device A to compensate for manufacturing variations in the firing voltage of the gas filled diode V1. In accordance with the illustrated embodiment of the invention, resistor R3 is included within the charging circuit 48; however, the position of this resistor may be changed without departing from the invention.

In practice, the various components of device A have the following parameters:

R1 _____ 12K (ohms); 40 watts.
R2 _____ 180 (ohms); 1 watt.
R3 _____ 1K (ohms); 5 watts (adjustable).
R4 _____ 15K (ohms); 1 watt.
R5 _____ 12K (ohms); 2 watts.

```
C1 _____ 150 (μfd); 150 volts.
C2 _____ 500 (μfd); 50 volts.
50 _____ 325 (ohms); 6 volts.
            Pull-in 10.5 ma.
            Drop-out 6.0 ma.
V1 _____ 92 volts conducting point.
```

With these values, device A requires 5.9 watts and draws 27 ma during normal operation. It is found that the device A with the above components operates with +1% of setting at ambient conditions and +2% at 150° F. The values illustrated in FIGURES 2 and 3 were derived from device A constructed with the above tabulated components.

The present invention has been described in connection with one structural embodiment; however, it will be appreciated that various structural changes may be made in this embodiment without departing from the intended spirit and scope of the present invention as defined in the appended claims.

Having thus defined our invention, we claim:

1. In an induction heating device comprising a generator having output leads connected across a heating station; first means for turning said generator off; and an overvoltage protector device for actuating said first means when the output voltage of said generator exceeds a preset limit; the improvement comprising: said overvoltage protector device including a relay having an actuating coil for actuating said first means; an electronic switching device in series with said coil; said switching device being conductive when a switching voltage exceeding a given value is impressed thereon; a first capacitor across which said switching voltage appears with said value of said switching voltage being determined by the charged level of said first capacitor; a voltage divider; said divider having first, second and third impedance sections; said first and second impedance sections being connected in parallel with said first capacitor; a circuit including a second capacitor and a resistor connected in parallel with said first impedance section whereby said first and second capacitors have different charging circuits; and the time constant for the charging circuit of said second capacitor being substantially greater than the time constant for the charging circuit of said first capacitor.

2. The improvement as defined in claim 1 wherein said electronic switching device is a gas filled tube with control terminals and said switching voltage being connected across said control terminals.

3. The improvement as defined in claim 1 wherein there is included a high resistance resistor in parallel with said switching device and in series with said actuating coil whereby under normal conditions, current flow through the resistor will not actuate said first means.

4. The improvement as defined in claim 1 wherein the ratio of the time constant of the charging circuit for said second capacitor and the time constant of the charging circuit for said first capacitor is approximately 4.0:0.7.

5. The improvement as defined in claim 1 wherein the charging circuit for both said first and second capacitors includes a rectifier.

6. In an induction heating device comprising a generator having output leads connected across a heating station; first means for turning said generator off; and an overvoltage protector device for actuating said first means when the output voltage of said generator exceeds a preset limit; the improvement comprising: said overvoltage protector device including a relay having an actuating coil for actuating said first means; an electron switching device in series with said coil whereby said coil is actuated when said switching device is conductive; a first capacitor across which said switching voltage appears with said value of said switching voltage being determined by the charged level of said first capacitor; a first charging circuit for said first capacitor with the voltage of said first charging circuit being proportional to the output voltage of said generator; a second charging circuit for said first capacitor with the voltage of said second charging circuit being added to the voltage of said first charging circuit and the value of said voltage in said second charging circuit being dependent on the charged level of a second capacitor; and the time constant of the second charging circuit being substantially greater than the time constant of the first charging circuit whereby small overvoltages will render said switching device conductive in a time determined primarily by said second charging circuit and large overvoltages will render said switching device conductive in a time determined primarily by said first charging circuit.

7. The improvement as defined in claim 6 wherein said electronic switching device is a gas filled tube with control terminals and said switching voltage being connected across said control terminals.

8. A voltage responsive time delay control device for actuating a switch in accordance with a sensed voltage variable above a given value, said time delay control device comprising an electronic switching device; said switch being actuated when said switching device is conductive; means for rendering said switching device conductive in response to a preselected voltage impressed upon said switching device; and circuit means for impressing said preselected voltage impressed upon said switching device; and circuit means for impressing said preselected voltage on said switching device in a time period inversely proportional to the extent said sensed voltage exceeds said given value; said circuit means comprising a first capacitor across which said switching voltage appears; a charging circuit for said first capacitor with the voltage across said charging circuit being proportional to said sensed voltage, and a robber circuit for decreasing the voltage in said charging circuit in accordance with the charged level of a second capacitor in said robber circuit whereby the voltage in said charging circuit increases as said second capacitor is charged, said charging circuit being adjusted so that said charging circuit raises the charged level of said first capacitor to said preselected voltage irrespective of the charged level of said second capacitor when said sensed voltage greatly exceeds said given value and said charging circuit requires a given charged level of said second capacitor when said sensed voltage only slightly exceeds said given value.

9. A voltage responsive time delay control device for actuating a switch in accordance with a sensed voltage variable above a given value, said time delay control device comprising an electronic switching device; said switch being actuated when said switching device is conductive; means for rendering said switching device conductive in response to a preselected voltage impressed upon said switching device; and circuit means for impressing said preselected voltage on said switching device in a time period inversely proportional to the extent said sensed voltage exceeds said given value; said circuit means comprising a first capacitor across which said switching voltage appears; a charging circuit for said first capacitor; said charging circuit comprising a first voltage source and a second voltage source; means for adding the voltage from said sources; the voltage from at least said first power source being proportional to said sensed voltage; said second voltage source including a second capacitor with the output of said second source being controlled by the charged level of said second capacitor; with the time constant for charging said second capacitor being substantially greater than the time constant for charging said first capacitor.

10. In an induction heating device comprising a power supply having output leads connected across a heating station; first means for turning said power supply off; and an overvoltage protector device for actuating said first means when the output voltage of said power supply exceeds a preset limit; the improvement comprising: said overvoltage protector device including a switch for actuating said first means; an electronic switching device, said switch being actuated when said switching device is conductive; means for rendering said switching device conductive in response to a preselected voltage impressed upon said switching device; and circuit means for impressing said preselected voltage on said switching device in a time period inversely proportional to the amount of overvoltage; said circuit means comprising a first capacitor across which said switching voltage appears; a charging circuit for said first capacitor; said charging circuit comprising a first voltage source and a second voltage source; means for adding the voltages from said sources; the voltage from at least said first power source being proportional to the output voltage of said power supply; said second voltage source including a second capacitor with the output of said second source being controlled by the charging level of said second capacitor; with the time constant for charging said second capacitor being substantially greater than the time constant for charging said first capacitor.

11. In an induction heating device comprising a power supply having output leads connected across a heating station; first means for turning said power supply off; and an overvoltage protector device for actuating said first means when the the output voltage of said power supply exceeds a preset limit; the improvement comprising: said overvoltage device having an electron switching device for actuating said first means when a given switching voltage is applied to said switching device; a first capacitor across which said switching voltage appears; a voltage source for charging said first capacitor; said voltage source including an output formed from adding a first voltage proportional to the output voltage of said power supply and a second voltage determined by the charged condition of a second capacitor; means whereby both of said voltages are required to charge said first capacitor to said given switching voltage with low over-voltages and only said first voltage is required to charge said first capacitor to said given switching voltage with high overvoltages.

12. In an induction heating device comprising a power supply having output leads adapted to be connected across a heating station; first means for turning said power supply off; and an overvoltage protector device for actuating said first means when the output voltage of said power supply exceeds a preset limit; the improvement comprising: said overvoltage device having an electron switching device for actuating said first means when a given switching voltage is applied to said switching device; and a switching voltage source, said voltage source having a capacitor, an output circuit across said capacitor for applying a voltage to said switching device in accordance with the charged condition of said capacitor, and a charging circuit for said capacitor, said charging circuit including supply means for varying the charging voltage in accordance with the voltage across said output leads, wherein said supply means includes a dual voltage circuit for charging said capacitor with the summation of two voltages, the first voltage varying directly with the voltage across said output leads and the second voltage varying exponentially with the voltage across said output leads.

13. The improvement as defined in claim 12 wherein said second voltage is controlled by the charged condition of a second capacitor with the charging circuit of the second capacitor having a time constant substantially different from the time constant of the charging circuit for said first-mentioned capacitor.

References Cited

UNITED STATES PATENTS

| | | | |
|---|---|---|---|
| 3,018,356 | 1/1962 | Busch, et al. | 219—519 X |
| 3,167,686 | 1/1965 | Riebs | 317—33 X |
| 3,307,075 | 2/1967 | Park | 317—31 X |

LEE T. HIX, *Primary Examiner.*

J. D. TRAMMELL, *Assistant Examiner.*